(12) United States Patent
Prasad et al.

(10) Patent No.: US 9,172,723 B2
(45) Date of Patent: Oct. 27, 2015

(54) METHOD OF PROVIDING TELECOMMUNICATIONS NETWORK SECURITY

(75) Inventors: Anand Raghawa Prasad, Tokyo (JP); Caroline Jactat, Berkshire (GB)

(73) Assignee: LENOVO INNOVATIONS LIMITED (HONG KONG), Quarry Bay (HK)

( * ) Notice: Subject to any disclaimer, the term of this patent is extended or adjusted under 35 U.S.C. 154(b) by 0 days.

(21) Appl. No.: 13/388,201

(22) PCT Filed: Jul. 13, 2010

(86) PCT No.: PCT/JP2010/062130
§ 371 (c)(1),
(2), (4) Date: Jan. 31, 2012

(87) PCT Pub. No.: WO2011/018931
PCT Pub. Date: Feb. 17, 2011

(65) Prior Publication Data
US 2012/0129491 A1    May 24, 2012

(30) Foreign Application Priority Data

Aug. 10, 2009  (GB) .................................. 0913909.8
Nov. 5, 2009  (GB) .................................. 0919398.8

(51) Int. Cl.
*H04M 1/66*  (2006.01)
*H04L 29/06*  (2006.01)
*H04W 12/04*  (2009.01)
*H04W 36/00*  (2009.01)

(52) U.S. Cl.
CPC .............. *H04L 63/20* (2013.01); *H04W 12/04* (2013.01); *H04W 36/0038* (2013.01); *Y02B 60/43* (2013.01)

(58) Field of Classification Search
None
See application file for complete search history.

(56) References Cited

U.S. PATENT DOCUMENTS

| | | | |
|---|---|---|---|
| 6,983,409 B1 * | 1/2006 | Vollmer et al. | ............... 714/748 |
| 7,519,178 B1 | 4/2009 | Matyas, Jr. et al. | |
| 2003/0109256 A1 | 6/2003 | Holcman | |
| 2009/0111428 A1 | 4/2009 | Blommaert et al. | |

(Continued)

FOREIGN PATENT DOCUMENTS

| CA | 2 659 959 | 2/2008 |
|---|---|---|
| CN | 1618241 A | 5/2005 |

(Continued)

OTHER PUBLICATIONS

3GPP TS 24.301 v8.1.0, 3rd Generation Partnership Project;Technical Specification Group Core Network and Terminals; Non-Access-Stratum (NAS) protocol for Evolved Packet System (EPS); Stage 3 (Release 8), Mar. 2009, p. 25, section 4.4.3.1.*

(Continued)

*Primary Examiner* — German J Viana Di Prisco

(57) ABSTRACT

Disclosed is a method of providing network security within a mobile radio communications network and including creating a security context for communications between a mobile radio communications device and the network, the security context being created responsive to an input parameter such as the downlink NAS count, and the method further including, as part of each initial handover attempt, controlling the parameter so as to apply a version of the parameter different from a previous version, for example as incremented downlink NAS count, and preferably independently of network signaling messages.

10 Claims, 3 Drawing Sheets

(56) References Cited

U.S. PATENT DOCUMENTS

| | | | |
|---|---|---|---|
| 2009/0154703 A1 | 6/2009 | Price et al. | |
| 2009/0161874 A1 | 6/2009 | Eun et al. | |
| 2010/0172500 A1* | 7/2010 | Wu | 380/272 |
| 2011/0092213 A1* | 4/2011 | Forsberg et al. | 455/436 |
| 2011/0222690 A1 | 9/2011 | Gan | |
| 2012/0077501 A1* | 3/2012 | Zhang et al. | 455/436 |

FOREIGN PATENT DOCUMENTS

| | | |
|---|---|---|
| CN | 101232736 A | 7/2008 |
| CN | 101304311 A | 11/2008 |
| EP | 1 422 875 | 5/2004 |
| EP | 1 562 340 | 8/2005 |
| JP | 2005-512471 | 4/2005 |
| WO | 2009/012281 | 1/2009 |
| WO | WO 2009/074356 | 6/2009 |
| WO | WO 2009/080480 | 7/2009 |
| WO | WO 2009/127930 | 10/2009 |
| WO | WO 2009/150493 | 12/2009 |

OTHER PUBLICATIONS

International Search Report, PCT/JP2010/062130, Feb. 25, 2011.
Search and Examination Report, GB0913909.8, Nov. 11, 2009.
Search and Examination Report, GB0919398.8, Jan. 21, 2010.
Chinese First Office Action dated Dec. 27, 2013; Application No. 201080035458.0.
Japanese Official Action—2012-503152—Jun. 4, 2013.
Japanese Office Action, dated Sep. 9, 2014, in corresponding Japanese Patent Application No. 2013-272633, with partial English translation.
NEC Corporation, NTT DOCOMO, Key-Chaining issue in I-RAT handover to UTRAN 3GPP TSG-SA3 Meeting SA3 ad-hoc, S3-091832, Sep. 30, 2009.
Ericsson, Huawei, ZTE, Nokia Corporation Nokia Siemens Networks, NEC Corporation, Counters relay on Inter-RAT, 3GPP TSG-SA3 Meeting SA3#55, S#-090917, May 4, 2009, 53-090917-CR-START COUNT 2b_revised v1.doc.

* cited by examiner

METHOD OF PROVIDING TELECOMMUNICATIONS NETWORK SECURITY

PRIORITY CLAIM

Priority is claimed on United Kingdom Patent Application No. 0913909.8, filed Aug. 10, 2009, and United Kingdom Patent Application No. 0919398.8, filed Nov. 5, 2009, the contents of which are incorporated herein by reference.

TECHNICAL FIELD

The present invention relates to telecommunications network security and to a related method and devices arranged for providing the same.

BACKGROUND ART

As mobile communication network technology evolves, and higher capability networks and systems become available, the mobile radio communications devices employed such as known Mobile Equipment (ME) and User Equipment (UE) tend to retain capabilities for different Radio Access Technologies (RAT) and so allow for handover procedures both on an inter-RAT and intra-RAT basis.

A high degree of security and integrity is an ongoing requirement for mobile communications networks and it is particularly desirable to seek to prevent interception of communications messages.

Security measures often currently employ keys such as a Ciphering Key (CK) and an Integrity Key (IK) and the generation of such keys often occurs during handover procedures.

It is noted that limitations and disadvantages exist in the operation and management of such security issues and that can lead to a potential compromise in security.

Known procedures for the generation and management of security keys are disclosed in United States Patent Application, Publication Nos. 2009/161874 A1, and 2009/154703 A1, Canadian Patent Application No. 2659959 A1 and U.S. Pat. No. 7,519,178 B1, which offer quite different solutions to the problem of security and enhancement as compared with the present invention.

DISCLOSURE OF INVENTION

The present invention seeks to provide for a method of establishing network security and a related mobile radio communications network element, having advantages over known such methods and network elements.

According to a first aspect of the present invention, there is provided a method of providing network security within a mobile radio communications network, including: creating a security context for communications between a mobile radio communications device and the network, the security context being created responsive to an input parameter; and, as part of each initial handover attempt, controlling the parameter so as to apply a version of the parameter different from a previous version.

In so far as the method of an exemplary embodiment of the present invention ensures that the input parameter for use in determining the security context, and as employed during the initial handover attempt of each handover procedure, differs from a previous one, this can prove advantageous in ensuring legacy parameters are not inadvertently employed in, for example, creating the security keys required.

In one example, the control of the parameter is not dependent upon network signaling for at least one handover attempt.

Preferably, the control of the parameter can be arranged not to be dependent upon signaling from the network to the mobile radio communications device for the at least one handover attempt.

In particular, the signaling can preferably comprise Non-Access Stratum (NAS) messaging.

Advantageously, the input parameter can comprise a signal count and, in particular, a Downlink (DL) NAS count.

Preferably, the method includes controlling the parameter for each initial handover attempt.

In an exemplary embodiment, the method can further include the step of monitoring for the success of the handover attempt.

Advantageously, a handover attempt can be repeated with the same parameter if it is determined that the initial handover attempt was not successful.

Advantageously, a further attempt at a handover can be permitted only if failure in proceeding attempt has been indicated.

Preferably, the success can be determined by receipt of a handover command by the mobile radio communications device.

Advantageously, an indication of handover failure can comprises a Non NAS delivery indication.

Advantageously, such Non NAS delivery indication can be arranged to be sent if it is indicated that the parameters are not received by the mobile radio communications device.

Preferably, the method can include sending a Inter-Radio Access Technology (IRAT) handover including a given value of a downlink NAS count while the mobile radio communications device indicates that it has not received the count.

Preferably, the method includes the step of not increasing the count once the RAT handover to Universal Mobile Telecommunication System (UMTS) message has been sent.

Preferably, the method can include performing a routing updating procedure at the mobile radio communications device responsive to a determination that the count has been employed in a previous handover and in particular the immediately preceding handover.

Advantageously the updating procedure can include information concerning key set availability so that the network can perform an authentication procedure.

In an exemplary embodiment, such further features can particularly be employed in a scenario in which a Radio Access Network (RAN) of a Long Term Evolution (LTE) system unreliably indicates that the mobile radio communications device has not received the count since a Layer 2 acknowledgement message from the UE has not been received by the RAN LTE.

Further, such features can preferably be employed in particular in relation to handovers to UMTS in which the key set identifier comprises a UMTS key set identifier, and so that the network can perform a UMTS authentification procedure.

According to another aspect of the present invention, there is provided a method of providing network security within a mobile radio communications network, including: creating security context for communication between a UE and a network, the security context being created responsive to a downlink NAS count; and, as part of each initial handover attempt, increasing the DL NAS count so as to distinguish from a previous count value.

As will be appreciated, an exemplary embodiment of the present invention can preferably be provided to enhance a handover procedure to UMTS and, in particular, a handover procedure from a Long Terminal Evolution (LTE) system.

An exemplary embodiment of the present invention can preferably prove particularly useful in relation to successive handovers from LTE to UMTS.

According to another aspect of the present invention, there is provided a mobile radio communications network element for operation within a mobile radio communications network and arranged for providing a security context for communication between a mobile radio communications device and the network, the network element being arranged such that the security context is created responsive to an input parameter and wherein, as part of each initial handover attempt, the network device is arranged to control the parameter so as to apply a version of the parameter different from a previous version.

Thus, it will be appreciated that an exemplary embodiment of the present invention can provide for mobile radio communications network element exhibiting the functionality of the various features of the method as defined above.

That is, the element can preferably ensure that the input parameter for use in determining the security context, and as employed during the initial handover attempt of each handover procedure is never the same for successive handovers, this can prove advantageous in ensuring legacy input parameters are not inadvertently employed when, for example, creating the security keys required.

Further, in an exemplary embodiment, the control of the parameter need not then be dependent upon signaling for at least one handover attempt within the handover procedure, and which signaling can comprise signaling from the network to the mobile radio communications device.

Again, for the network element, the signaling can preferably comprise Non-Access Stratum (NAS) messaging, and the input parameter can preferably comprise a signal count and, in particular, a Downlink (DL) NAS count.

As above the element can preferably include control functionality such that the handover attempt is repeated with the same parameter if it is determined that the initial attempt was not successful.

Preferably, the control functionality can include initiating a routing updating procedure at the mobile radio communications device responsive to a determination that the count has been employed in a previous handover and in particular the immediately preceding handover.

As above the updating procedure can preferably include information concerning key set availability so that the network can perform an authentication procedure.

In an exemplary embodiment, such further features can particularly be employed in a scenario in which a Radio Access Network (RAN) of a Long Term Evolution (LTE) system unreliably indicates that the mobile radio communications device has not received the count since a Layer 2 acknowledgement message from the UE has not been received by the RAN LTE.

Further, such features can preferably be employed in particular in relation to handovers to UMTS in which the key set identifier comprises a UMTS key set identifier, and so that the network can perform a UMTS authentification procedure.

With regard to a particular feature of one embodiment, the "initial" Handover From LTE Command message from the LTE Core Network can include an increased downlink NAS count compared to the current one. This increased downlink NAS count has previously been forwarded in a Forward Relocation Request to the UMTS Core Network during the IRAT (Inter Radio Access Technology) handover preparation phase.

If the Handover From LTE command message including the NAS security parameters has not been correctly received by the UE, the NAS Non Delivery Indication message can preferably be sent by the eNB to the LTE Core Network.

The LTE Core Network can preferably be arranged not to send any further Handover From LTE command message to the UE unless a NAS Non Delivery Indication message has been received from the LTE radio access network (eNodeB, eNB).

To avoid the downlink NAS count desynchronization between the UE and the MME, and if a NAS Non Delivery Indication has been received from the eNB, the LTE Core Network can preferably be arranged to retransmit the same NAS security container including the same Downlink NAS count as previously sent (i.e. not increased).

From the above, the LTE Core Network knows that upon receipt of Forward Relocation Complete, the UE has preferably used the Downlink NAS Count as included in the handover from LTE command sent to the UE.

With regard to LTE network-side components for example, the eNB can preferably be arranged to send NAS Non Delivery Indication including a NAS security container to the LTE Core Network if the handover from LTE command message has not been received by the UE.

Having regarded to the MME, the downlink NAS count may be increased only on the "initial" sending of the Handover From LTE command. Of course, in case of failure of transmission of the Handover From LTE command, the MME can preferably be arranged to resend the same previous NAS security containing in NAS PDU IE to UE via eNB.

In an exemplary embodiment, for the case when the Radio Access Network (RAN) from a Long Terminal Evolution (LTE) system unreliably indicates that the mobile radio communications device has not received the count because the Layer 2 acknowledgement message from the UE has not been received by RAN LTE, if the count is detected as being already used on a previous handover to UMTS for a successive handover to UMTS, the mobile radio communications device performs a routing area updating procedure including the information of no UMTS key set identifier available so that the network can perform a UMTS authentication procedure.

As will be appreciated, an exemplary embodiment of the invention can be applicable in particular when ISR is activated on IRAT handover from LTE but can in general be applicable to any IRAT handover from LTE.

It should be appreciated that an exemplary embodiment of the invention can also provide for a mobile radio communications device arranged to operate within a network and with a security context

BRIEF DESCRIPTION OF THE DRAWINGS

The present invention is described further hereinafter, by way of example only, with reference to the accompanying drawings in which.

EXEMPLARY EMBODIMENT FOR CARRYING OUT THE INVENTION

As will be appreciated, an exemplary embodiment of the present invention is discussed further, and illustrated with reference to the accompanying drawings, in relation in particular to the provision of a security context for LTE and UMTS systems and employing ciphering keys and integrity keys created in response to an input parameter downlink NAS count.

A particular disadvantage of the current art arises having regarded to the manner in which such security contexts are developed and particularly for successive handovers, and as will be discussed in greater detail below.

As noted, a security context generally comprises a ciphering key employed to ensure data confidentiality, and an integrity key employed to ensure that no corruption of data has occurred during its transfer between the two communicating parties.

As an example, a UMTS security context can be created between a UE and a network for providing secure access to a UMTS system and, likewise, a LTE security context can be created between a UE and a network for access to the LTE system.

Further, an Access Stratum security context can be created for each UMTS or LTE security context to ensure security is maintained with regard to the relevant layer of the protocol stack.

As noted, and particularly within an inter-RAT environment, a UE can move from LTE to UMTS in connected mode and in such a scenario, the UMTS security context is derived from the preceding LTE security context. An input parameter of the LTE security context can, for example, comprise the downlink NAS count.

Of course, it will be appreciated that the downlink NAS count is increased whenever the network sends a NAS message to the UE.

It will therefore be appreciated that, in scenarios in which the UE performs successive handovers from LTE to UMTS, and wherein the network does not send any NAS messages to the UE, the same UMTS security context would then be reused.

An absence of NAS messages from the network from the UE can be initiated, for example, if the Idle Mode Signaling Reduction (ISR) feature is activated.

Figure 1:
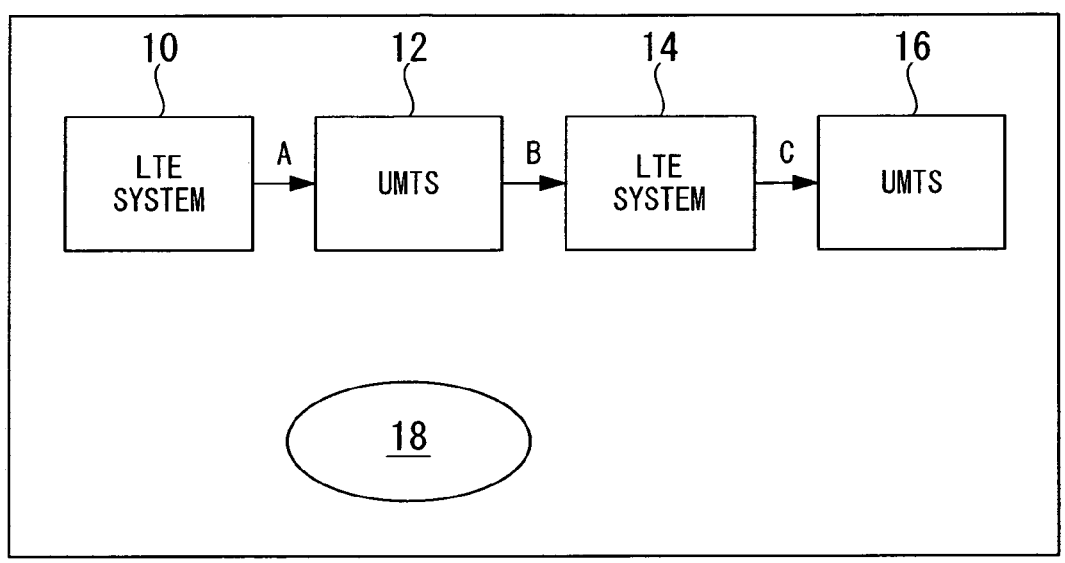
FIG. 1 is a schematic representation of successive handovers illustrating limitations of the current art.

Such potential compromise in security is illustrated further with reference to FIG. 1. Here, initial connection to LTE system 10 is first indicated, with subsequent handover to UMTS 12, subsequent return to a LTE system 14 and a subsequent handover back to UMTS 16.

Turning first to the initial connection to the LTE 10, a current LTE security context is developed and comprises a ciphering key and an integrity key.

Upon movement of the UE, as illustrated by arrow A, in connected mode to the UMTS 12, a UMTS security context again with a ciphering key and integrity key is then created as a result of mapping from the security context of the LTE 10 and employing a downlink NAS count as input parameter.

In the illustrated scenario, the UE then moves in idle mode as illustrated by arrow B to LTE system 14 and again employing a security context mirroring that created previously on the previous move to LTE 10.

More importantly however, in a scenario in which there is activation 18 of an ISR feature for the UE (not shown), no NAS signaling will then be sent from the network to the UE such that there is no increment in the value of the downlink NAS count.

Accordingly, upon next successive movement of the UE to UMTS 16 as indicated in connected mode by arrow C, a UMTS security context with ciphering key and integrity key is created as a result of mapping from the LTE security context and using the same downlink NAS count as used in relation to the previous move to UMTS 12. The same security keys are therefore employed in relation to the move to UMTS 16 as was the case for the move UMTS 12. Of course, if a third party "attacker" seeking to intercept communication can access keys from a previous move at the UE in UMTS, then the "attacker" would be able to reuse these keys on the next UE move to UMTS 16. Interception of the communication between the UE and the network would then be possible which, of course, represents a substantial breach in security.

As will be appreciated from the previous discussion and indeed the illustrated examples follow the present invention can prove advantageous in ensuring that the input parameter, in the illustrated example, the downlink NAS count, cannot remain the same between successive handovers such that, if an attacker comes into possession of keys from a previous move of the UE to UMTS, this will not compromise any subsequent communication exchanges.

Various known attempts have been made to improve such security matters in addition to the prior art documents mentioned previously. For example, attempts have been made to use an uplink NAS count in order to derive a UMTS security context; to use AS Next Hop (NH) and Next Chain Count (NCC) security parameters to produce different AS keys; the use of NAS Nonce UE and Nonce MME security parameters; the running of NAS security mode command procedures and the use of downlink NAS messages from the network. However, all of these examples suffer limitations insofar as they have an impact on both the UE and the network and, in some instances, are restricted by backward compatibility issues.

Figure 2:
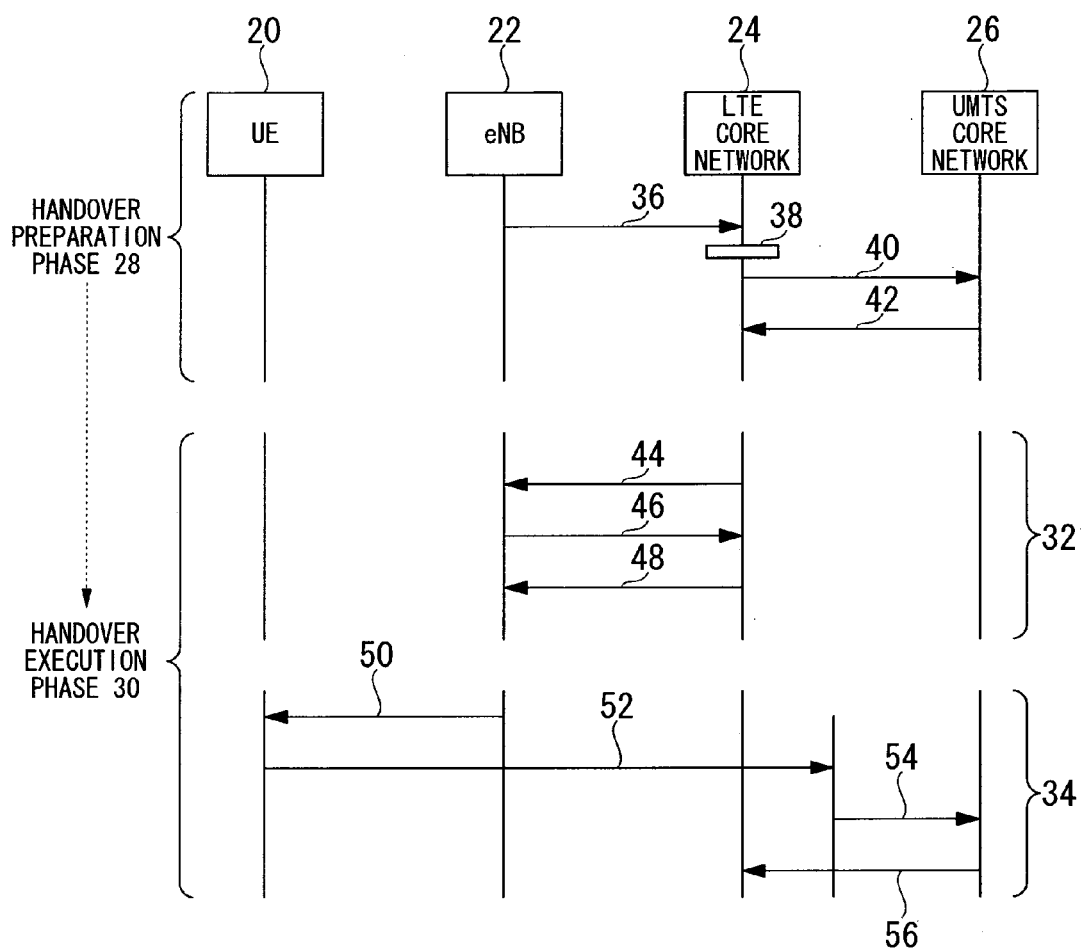
FIG. 2 is a signaling diagram for handover examples relating to LTE and UMTS core networks and according to an embodiment of the present invention.

Turning now to FIG. 2, there is provided a signaling diagram illustrating an embodiment of the present invention and which covers a scenario in which a handover command is not received by the UE, and a scenario in which the handover command has been received by the UE.

FIG. 2 illustrates in schematic form network arrangements for a UE 20 and a eNB 22 of its access network, and also a network element comprising a LTE core network 24 and UMTS core network 26. It will therefore be appreciated, that the illustrated embodiment relates to successive handovers from a LTE system to a UMTS system.

The illustrated procedure commences from a handover preparation phase 28 in which a "handover required" signaling message 36 is sent from the eNB 22 to the LTE core network 24 and, in accordance with the embodiment, a controlled increase in the downlink NAS count is initiated at 38. Then, a forward communication request signal 40 from the LTE core network 24 to the UMTS core network 26, and a forward communication response 42 delivered therefrom, take account of both the UE identity and the UMTS security context mapped from the LTE network 24 and on the basis of the incremented downlink NAS count.

As will therefore be appreciated, this controlled incremented change in the downlink NAS count, ensures that for the handover being prepared, the security context, and thus related security keys, will be different from those arising in relation to any preceding handover and so as to avoid a potential compromise in security.

Subsequent to the completion of the handover preparation phase 28, signaling relating to a handover execution phase 30 commences with a handover command 44 from the LTE network 24 to the eNB 22. As will be appreciated from the following, in accordance with the handover procedure being illustrated, no further "handover command" message will be sent from the LTE core network 24 to the UE 20 unless a "NAS non delivery indication" message has been received from the LTE radio access network eNB and, importantly and as discussed further below, any such re-sent will employ the same downlink NAS count as previously incremented during the handover preparation phase 28 discussed above.

Two scenarios arise during the handover execution phase 30 and each of which is illustrated in FIG. 2.

In the first scenario 32, the handover command is not successfully received by the UE 20. However and as noted above, the handover command signal 44 is not present but rather a NAS non-delivery indication signal 46 is delivered from the eNB 22 to the LTE core network 24.

This particular signaling message 46 is an important step in the method embodying the present invention insofar as, only upon receipt of this signaling message 46, LTE core network 24 resends the handover command signal 48. Importantly, the resent handover command 48 employs the same NAS security container including the same downlink as NAS counter as previously sent and this advantageously serves to maintain downlink NAS count synchronization between the UE 20 and the network element of the core network such as the Mobile Management Entity (MME).

In an alternative scenario 34, the handover command signal 44 is successfully received by the UE as indicated by the command message 50 and the subsequent Handover to UMTS Complete message 52 delivered from the UE 20 to the UMTS radio access network. This then initiates a communication complete signaling message 54 to the UMTS core network 26. The UMTS core network 26 responds with a forward relocation complete signaling message 56 to the LTE core network 24.

Advantageously, upon receipt of such forward relocation complete signaling message 56, the LTE core network can readily determine that the UE 20 has used the incremented downlink NES count as included in the "handover command" sent to the UE 20. This serves as reassurance that no security compromise can have arisen in regard to the establishment of the security keys and related security context.

As will be appreciated, during any subsequent handover preparation phase for subsequent LTE to UMTS handover, the downlink NAS count is then incremented so as to avoid the re-use of the previous downlink NAS count and as functioning as input parameter for determination of the security keys.

Security compromises such as those encountered in the current art can therefore advantageously be avoided.

As should be appreciated, and with particular reference to the illustrated embodiment, the present invention advantageously provides for a signaling message comprising a non NAS delivery indication if the NAS security parameters have not been received by the UE. Further, an IRAT handover to UMTS signaling message including a given value of a downlink NAS count continues until receipt of the UE has occurred and such that the count is not increased simply once the IRAT handover to the UMTS message has been sent. This allows for maintenance of synchronization between the UE and, for example, the MME.

Figure 3:
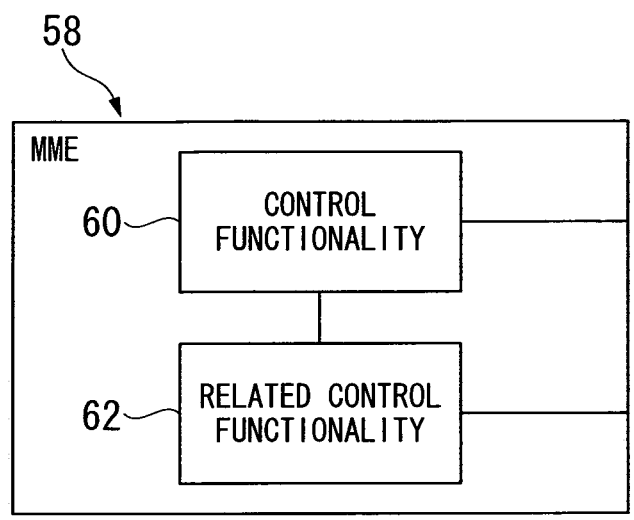
FIG. 3 is a schematic diagram of a radio communications network element according to an embodiment of the present invention.

Turning finally to FIG. 3, there is provided a simple schematic representation of a network element forming part of a network device and embodying the present invention, such as an MME 58. The MME 58 is arranged to include control functionality 60 for increasing, for example, the downlink NAS count on the "initial" sending of a Handover From LTE command, and which further includes related control functionality 62 serving to initiate a resend of the same NAS security container upon determination of delivery failure of the Handover From LTE command at the UE. As such the control element 60 will only send a non-incremented downlink NAS count after determination of failure of the previous transmission to the UE. Of course, and as noted above, if the transmission of the handover command to the UE is successful, then on the next instance of the initial stages of a further handover procedure, the control functionality 60 again increments the downlink NAS count irrespective of the actual state of downlink NAS signaling that might have occurred between the two successive handover procedures. If the UE detects that the same or older downlink NAS count is reused, the UE performs a NAS routing area updating procedure.

It should be appreciated that the invention is not restricted to the details of the foregoing embodiment and can relate to the control of any appropriate security parameter with regard to an appropriate handover procedure. In particular, the invention is applicable to scenarios in which the ISR is activated on IRAT handover from LTE although, in further generality, it is applicable to any IRAT handovers from LTE.

INDUSTRIAL APPLICABILITY

The present invention can be applied to a mobile radio communications between a mobile radio communications device and a network to provide a high degree of network security within the network.

The invention claimed is:

1. A method of providing network security within a mobile radio communications network during each of a plurality of handover procedures, the network including a radio access part and a core part, the method comprising:
the core part creating a security context for communications between a mobile radio communications device and said network, said creation of the security context comprising generating a security key using a value of a Non-access stratum (NAS) count as an input parameter;
as part of an initial handover attempt of said handover procedure, the core part of the network sending a handover command signal to the radio access part of the network, which sends the handover command signal to the mobile radio communications device, and controlling said value of the NAS count so as to ensure that a different respective value of the NAS count is employed during each successful initial handover attempt; and
when the radio access part determines that the handover command signal has not been received by the mobile communication device, the radio access part sending a non-delivery indication signal to the core part and the core part resending through the radio access part the handover command signal, including a same NAS count, in response to the non-delivery indication signal.

2. The method as claimed in claim 1, wherein the step of controlling the value of the NAS count comprises incrementing the value of the NAS count for a respective initial handover attempt of each successful handover procedure.

3. A method as claimed in claim 2, further comprising the network determining that the initial or a subsequent handover attempt was successful if the handover command signal is received by the mobile radio communications device.

4. The method as claimed in claim 1, including the step of storing, for each handover procedure, the respective value of the NAS count as part of a security context for subsequent handover to a Universal Mobile Telephone System UMTS.

5. The method as claimed in claim 4, including the step of detecting a same or older value of the NAS count by comparison of each stored value with a next expected value stored as part of a security context for the subsequent handover attempt to the UMTS.

6. The method as claimed in claim 5, wherein said same or older value of the NAS count is detected by a mobile radio communications device within said network.

7. The method as claimed in claim 6, including the step of performing at the mobile radio communications device, routing area update procedure including the provision of an identifier for indication that no UMTS key set is available for seeking initiation of a UMTS authentication procedure.

8. The method as claimed in claim 1, further comprising controlling said value of the NAS count during periods of non NAS-signaling exchange between the mobile radio communication device and the network.

9. The method as claimed in claim 8, further comprising controlling said value of the NAS count during periods of Idle Mode Signaling Reduction activation.

10. The method as claimed in claim 1, further comprising controlling the parameter for each initial handover attempt.

* * * * *